(12) United States Patent
Delecroix et al.

(10) Patent No.: US 12,363,038 B2
(45) Date of Patent: Jul. 15, 2025

(54) GLOBAL MULTI-CLOUD OVERLAY NETWORK WITH REGIONAL PREFERENCE

(71) Applicant: Aviatrix Systems, Inc., Santa Clara, CA (US)

(72) Inventors: Nicolas Delecroix, Santa Clara, CA (US); Praveen Konda, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

(21) Appl. No.: 18/738,861

(22) Filed: Jun. 10, 2024

(65) Prior Publication Data

US 2024/0333648 A1 Oct. 3, 2024

Related U.S. Application Data

(63) Continuation of application No. 17/900,858, filed on Aug. 31, 2022, now Pat. No. 12,010,022.

(60) Provisional application No. 63/257,027, filed on Oct. 18, 2021.

(51) Int. Cl.
H04L 45/76 (2022.01)

(52) U.S. Cl.
CPC .................. H04L 45/76 (2022.05)

(58) Field of Classification Search
CPC ...................................... H04L 45/76
USPC .......................................... 709/244
See application file for complete search history.

(56) References Cited

U.S. PATENT DOCUMENTS

| | | | |
|---|---|---|---|
| 2016/0308762 A1 | 10/2016 | Teng et al. | |
| 2020/0059492 A1* | 2/2020 | Janakiraman | H04L 63/0263 |
| 2020/0322249 A1* | 10/2020 | Liu | H04L 41/12 |
| 2021/0105208 A1* | 4/2021 | Hira | H04L 45/745 |
| 2021/0160138 A1* | 5/2021 | Barnes | G06F 9/5027 |
| 2021/0306261 A1* | 9/2021 | Duan | H04L 45/56 |

* cited by examiner

*Primary Examiner* — Lan Dai T Truong
(74) *Attorney, Agent, or Firm* — Winstead PC (57) ABSTRACT

A computerized method for avoiding cross-region communications when utilizing a cloud overlay network is described. The method involves an operation of deploying one or more spoke gateways within at least a first region and a second region of a first virtual private cloud network. Thereafter, a region and a virtual private cloud network associated with a source and a destination of a communication are determined. Upon determining that the destination of the communication resides within a second virtual private cloud network, which is different than the first virtual private cloud network, the routing of the communication between the source and the destination is controlled by one or more spoke gateways solely residing within the region in which the source.

15 Claims, 9 Drawing Sheets

GLOBAL MULTI-CLOUD OVERLAY NETWORK WITH REGIONAL PREFERENCE

CROSS-REFERENCE TO RELATED APPLICATIONS

This application claims the benefit of priority of U.S. patent application Ser. No. 17/900,858 filed Aug. 31, 2022, now U.S. Pat. No. 12,010,022, and U.S. Patent Application No. 63/257,027 filed Oct. 18, 2021, the entire contents of each of which are incorporated by reference herein.

FIELD

Embodiments of the disclosure relate to the field of networking. More specifically, one embodiment of the disclosure relates to a software-defined cloud overlay network with ingress and egress based on regional preference.

GENERAL BACKGROUND

Over the past few years, cloud computing has provided Infrastructure as a Service (IaaS), where components have been developed to leverage and control native constructs for all types of public cloud networks, such as AMAZON® WEB SERVICES (AWS), MICROSOFT® AZURE® Cloud Services, GOOGLE® Cloud Services, ORACLE® Cloud Services, or the like. These components may operate as part of a software-defined overlay network infrastructure, namely a network configured to control the transmission of messages between resources maintained within different virtual networking infrastructures of a public cloud network.

More specifically, the overlay network may be configured with ingress and egress points at selected virtual networking infrastructures, which may vary depending on the public cloud provider. For example, the virtual networking infrastructures may include virtual private clouds for AMAZON® WEB SERVICES or for GOOGLE® Cloud Platform, virtual networks (VNets) for MICROSOFT® AZURE® Cloud Services, or the like.

Currently, some cloud service providers (CSPs), such as GOOGLE® Cloud Platform (GCP) for example, offers virtual private clouds with a global infrastructure. Stated differently, GCP may provide a virtual private cloud having multiple resource subnetworks (subnet) that reside in different regions, which may constitute different geographic regions that may be separated by a distance spanning hundreds or thousands of miles. Each resource subnetwork features one or more workloads (e.g., application instances, virtual machine (VM) instances, etc.). This global infrastructure is problematic for conventional overlay networks.

Conventional overlay networks are configured to allocate a pair of gateways (e.g., primary and secondary gateways) for each virtual private cloud. Where a virtual private cloud supports multiple regions and the gateways are situated within a first region (e.g., US-West), the workloads residing in regions other than the first region (e.g., US-East) would be forced to communicate with gateways in a different region to transmit messages over the overlay network. This cross-region communications would subject workloads outside of the first region to higher transmission costs and longer latencies when using the overlay network. Region-awareness for virtual private cloud networks in utilizing network overlay infrastructures is needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of a software-defined multi-cloud (or cloud) overlay network configured with spoke subnetworks (hereinafter, "spoke subnet"), deployed in each region of a global VPC (defined below) where workloads exist, is described. The overlay network is configured to establish communications with one or more workloads (hereinafter, "workload(s)") residing outside the global VPC. The workload(s) may correspond to instances (e.g., application instance, virtual machine (VM) instance, etc.) operating within or as part of a virtual network infrastructure. Herein, the virtual networking infrastructure may constitute any of a virtual private cloud deployed within an AMAZON® WEB SERVICES (AWS) public cloud network, a virtual private cloud deployed within a GOOGLE® CLOUD public cloud network, a virtual network (VNet) deployed within a MICROSOFT® AZURE® public cloud network, a virtual cloud network deployed within an ORACLE® CLOUD public cloud network, or the like. As described below, we shall refer to each of these types of virtual networking infrastructures, independent of the cloud service provider (CSP), as a "virtual private cloud network" or "VPC."

Supporting communications between resources (e.g., workloads) located in different public cloud networks, a multi-cloud network features an overlay network operating in concert with an underlay network. The underlay network may feature multiple cloud service provider (CSP) networks, each formed with native cloud constructs associated with a different public cloud network. Stated differently, for a multi-cloud network, multiple CSP networks may collectively operate as the underlay network with the overlay network supporting communications between different VPCs located within the same public cloud network or located within different public cloud networks.

For this embodiment, each spoke subnet includes a plurality of spoke gateways, which operate as ingress (input) and/or egress (output) points for network traffic sent over the overlay network that may span across a single public cloud network or may span across multiple public cloud networks. More specifically, the overlay network with regional preferences may be deployed to support a single public cloud network with multiple VPCs or may be deployed to support a multiple public cloud network (sometimes referred to as a "multi-cloud overlay network"). For clarity and illustrative purposes, however, the term "overlay network" is described as a network that supports communications between different VPCs residing within the same public cloud network or within different public cloud networks.

According to one embodiment of the disclosure, the overlay network features at least (i) a "region-aware" control plane and (ii) a data plane. The control plane is configured to support the transmission of control messages between a controller and gateways of the overlay network. The control messages are intended to populate data stores with information that may be used to control the routing of data messages pertaining to inter-region network traffic. The data plane is configured to support the transmission of data messages between gateways associated with different VPCs based on the information provided by the data stores.

Herein, the overlay network (described below) provides a number of advantages, including the following:
(1) Leveraging native constructs (e.g., CSP network) for intra-region traffic within a global VPC, lowering the cost and the latency of the traffic.
(2) Easily onboarding of existing customers with workload(s) (e.g., application instances, VM instances, etc.) deployed in a subnetwork of the global VPC, with no need to rebuild a new VPC and migrate workload(s).
(3) Automated controller route learning and data propagation with region awareness, which eliminates the risk for mistakes that may be observed with manual entry of the control information.
(4) Automated and optimized routing of content from workload(s) over the overlay network, which improves the time to deploy new applications and reduces the friction between the networking teams and the application teams.
(5) Smart handling of conflicting routes to prevent traffic blackholing (i.e., network traffic loss based on data traffic blocking, which would impact operability of a business.

Herein, a multi-cloud network features a plurality of public cloud networks, each including VPCs. A multi-cloud overlay network is configured to establish communications between workload(s), such as virtual machine (VM) instances operating as part of the VPCs. In general, a "VPC" is an on-demand, configurable pool of shared resources, which may be accessible via communications (messages) within the multi-cloud overlay network. For example, a portion of multi-cloud overlay network, such as one or more spoke subnets for example, may be deployed as part of a VPC.

The spoke gateways within each spoke subnet may be used as an entry (or ingress) point for inter-VPC network traffic within a region occupied by the spoke subnet. As an illustrative example, the inter-VPC network traffic may include, but is not limited or restricted to ingress data traffic such as data messages directed to a spoke gateway (residing within a spoke subnet of a first VPC) from a workload (sourcing the data messages and residing in a second VPC different than the first VPC). The inter-VPC network traffic may also include data messages from a workload (e.g., application or VM instance) within a resource subnet within the VPC that are directed to a spoke gateway for the region, which is operating as an exit (or egress) point for data messages provided from the workload for transmission over the overlay network. The VPCs may be further configured with native cloud constructs to support the routing of intra-VPC network traffic (intra-VPC data messages) therein.

A "global VPC" constitutes a VPC that includes workload(s) within subnets deployed in different regions, where each region generally constitutes a geographic area that is remotely located from another region. For example, the global VPC corresponds to a VPC that may span across different regions of a country (e.g., a first region associated with the Western United States (US-West) and a second region associated with the Eastern United States (US-East)). Additionally, or in the alternative, the global VPC corresponds to a VPC that may span across different countries (e.g., one region associated with the Western United States (US-West) and another region associated with Western European countries (Europe-West)).

With respect to each region of the global VPC, a plurality of spoke gateways are created to operate as ingress (input) and/or egress (output) points for network traffic through the multi-cloud overlay network. For example, a plurality of spoke gateways are created within a first region to operate as (i) an egress (output) point for network traffic to be propagated through an overlay network from a workload (e.g., VM instance) deployed within the first region and/or (ii) an ingress (input) point for network traffic through the overlay network directed to a workload deployed within the first region. As a result, by deploying different spoke gateways within each region of the global VPC to provide workload(s) within that region with access to the overlay network, cross-region network traffic may be avoided. The elimination of cross-region network traffic provides significant cost savings and offers reduced latency for resources accessing cloud services across a public cloud network or multi-cloud network.

According to one embodiment of the disclosure, the overlay network with regional preference is created and maintained based on a control plane learning scheme and a control plane propagation scheme. Herein, according to one embodiment of the control plane learning scheme, the control plane operates in accordance with a route learning process in which the controller is configured to understand the regions in a global VPC. More specifically, the controller may be configured to acquire location information associated with spoke gateways when created (or launched). Where a spoke gateway is deployed within a first region, without user intervention, the controller is configured to program a data store accessible to the spoke gateway (i.e., spoke gateway data store) that restricts access to application subnets only operating in the first region. Stated differently, the spoke gateway only learns the application subnets from the region in which the spoke gateway is deployed.

Furthermore, when a spoke gateway is communicatively coupled to a transit gateway, the region of the VPC where the spoke gateway resides becomes part of the overlay network. At this point, the control plane (e.g., controller, etc.) collects or has collected all subnet routes from the region occupied by the spoke gateway, and populates a data store accessed by the transit gateway (e.g., transit gateway data store) with all subnet routes from the region occupied by the spoke gateway. As a result, the transit gateway learns that the spoke gateway is the gateway where network traffic should be sent for reaching this global VPC region.

Additionally, new subnet routes may be added after spoke gateway attachment and/or subnet routes have been removed. The controller is configured to detect, without user intervention, one or more route changes, and as a result, re-program routing information within gateway data store(s) such as one or more spoke gateway data stores associated with spoke gateways and/or transit gateway data store(s) for transit gateways affected by the route change(s). The detection of routes change(s) can be achieved with a periodic polling of the subnet routes through a prescribed Application Programming Interface (API) or by subscribing to a notification service provided from the CSP. As an alternative embodiment, the detection of the route change(s) may be based on a tenant (user) administrator manually adding, removing or altering subnet routes maintained by the controller through rendered visualization displays, where each subnet route would specify a region and VPC.

As further described below, in accordance with one embodiment of the control plane propagation scheme, "learned" subnet routes (as explained above) are then propagated by the controller to certain components of the control plane, namely VPC route data store(s) for the underlay network and gateway route data stores(s) for use by the gateways of the overlay network. The subnet routes could be used to identify routes associated with the same VPC region, with other VPC regions, with other clouds, and/or with an on-premises network.

The overlay routing may involve directing network traffic, originating from a workload (e.g., VM instance) and destined to a resource outside the VPC, into a spoke gateway for entry into the multi-cloud overlay network. The spoke gateway would reside within the same region as the workload. In particular, routes are propagated into the VPC route data store by the controller of the control plane, where the routes are established in accordance with region awareness. Hence, network traffic originated by workload in region A of a VPC must be sent to a spoke gateway of region A of that VPC. The network traffic from the workload would not be sent to a spoke gateway of region B.

To achieve region awareness, various methods can be used depending on the CSP. For instance, route tagging may be utilized. Subnet routes are created by the controller for each plurality of spoke gateways designated to a particular region. The subnet routes are set with unique tags that indicate the region. Workloads are then applied with the tag for their region in order for the network traffic sourced by the workload(s) to be routed to their regional spoke gateways. The control plane automatically tags the workload(s) with the correct tag of their region. The tagging sequence may operate as follows: (1) attach spoke gateway to transit gateway; (2) create VPC routes with regional tags for all routes known by the controller for that VPC (independent of region location) for storage within the VPC route data store; and (3) tag the workload(s). Therefore, network traffic from workload(s) with regional tags that match the regional tags are assigned to the spoke gateway and are processed by the spoke gateway. Otherwise, the network traffic via the assigned spoke gateway is ignored as this network traffic would constitute intra-VPC network traffic.

Additionally, workload(s) could be added by the tenant (user) after attachment of a new spoke gateway. If route tagging is relied upon to influence the VPC routing, then the workload(s) have to be tagged for traffic to reach their (regional) spoke gateway. The controller may be able to dynamically discover new workload(s) through a number of processes. For example, a first process may involve (i) polling the CSP API or (ii) subscribing to a CSP notification service that provides current discovery lists of existing workload(s). Thereafter, contents of the current discovery list are compared to contents of an existing discovery list to determine new workload(s). The current discovery list is stored on the controller. A secondary process involves conducting a determination as to which workload(s) are untagged (i.e., no tag assigned to them). Upon identify a workload that needs a tag, the controller applies the relevant route tag to the workload based on its region and VPC.

Before storage of a route within the VPC route data store, the control plane may be configured to conduct an analysis for conflicts against subnet routes in all regions of the VPC—not only the region where gateways exist or are attached to the transit gateway. If there is a conflict, then the control plane raises an alert and rejects the propagation entirely to that VPC. The rejection occurs because, from the perspective of that VPC, a reachability route already exists for the VPC. In most CSPs, the VPC route data store is unable to be programmed with a more specific route other than a default VPC subnet route.

The subnet routes are propagated by the control plane into all gateways as well as to on-premises networks. However, what is specific about the regional preference is that the control plane is not propagating the subnet routes of a given VPC region into another spoke gateway that is in the same VPC and in a different region, even though the spoke gateways within the VPC regions could be connected to the same transit gateway. Intra-VPC traffic is propagated through a CSP network, even where the network traffic is between different regions in the same VPC. The network traffic does not need to enter the overlay network; rather, intra-VPC traffic is handled by native cloud constructs associated with the VPC.

I. Terminology

In the following description, certain terminology is used to describe features of the invention. In certain situations, each of the terms "resource," "component" or "logic" is representative of hardware, software, or a combination thereof, which is configured to perform one or more functions. As hardware, the resource (or component or logic) may include circuitry having data processing and/or storage functionality. Examples of such circuitry may include, but are not limited or restricted to a processor (e.g., microprocessor, one or more processor cores, a programmable gate array, a microcontroller, an application specific integrated circuit, etc.); non-transitory storage medium; a superconductor-based circuit, combinatorial circuit elements that collectively perform a specific function or functions, or the like.

Alternatively, or in combination with the hardware circuitry described above, the resource (or component or logic) may be software in the form of one or more software modules. The software module(s) may be configured to operate as one or more software instances with selected functionality (e.g., virtual processor, data analytics, etc.), a virtual network device with one or more virtual hardware components, or an application. In general, the software module(s) may include, but are not limited or restricted to an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a superconductor or semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device.

Types of resource may include application instances and/or virtual machine (VM) instances such as compute engines, local data storage, or the like. One type of component may be a cloud component, namely a component that operates as part of a public cloud network. Cloud components may be configured to control network traffic by restricting the propagation of data between cloud components of a multi-cloud network such as, for example, cloud components of a multi-cloud overlay network or cloud components operating as part of a native cloud infrastructure of a public cloud network (hereinafter, "native cloud components").

Controller: A "controller" is generally defined as a component that provisions and manages operability of cloud components over a multi-cloud network (e.g., two or more public cloud networks), along with management of the operability of a virtual networking infrastructure having multiple regions, such as a virtual private cloud (VPC) deployed in GOOGLE® CLOUD for example. This management may include leveraging intelligence (e.g., addresses, attributes such as assigned tags, etc.) acquired from components communicatively coupled to the gateways forming a portion of an overlay network whose operability is controlled by the controller. According to one embodiment, the controller may be a software instance created for a tenant to provision and manage the multi-cloud overlay network, which assists in communications between different public cloud networks. The provisioning and managing of the multi-cloud overlay network is conducted to manage network traffic, including the transmission of data, between components within different public cloud networks.

Tenant: Each "tenant" uniquely corresponds to a particular customer provided access to the cloud or multi-cloud network, such as a company, individual, partnership, or any group of entities (e.g., individual(s) and/or business(es)).

Region: Each "region" is an independent geographic area that allows users to host their resources. Since regions are independent geographic areas, spreading your resources (e.g., application instances, virtual machine instances, etc.) across different regions provides isolation from resource failures caused by software errors or corruption as well as hardware, software or other infrastructure failures. This provides system failure protection, given resource independence provided by the different regions.

Workload: A "workload" is generally defined as a particular resource relying on virtual or physical logic with data processing and/or data storage functionality. Herein, a workload may include a software instance such as an application instance configured to perform functions based on information received from cloud components.

Gateway: A "gateway" is generally defined as virtual or physical logic with data monitoring or data routing functionality. As an illustrative example, a first type of gateway may correspond to virtual logic, such as a data routing software component that is assigned an Internet Protocol (IP) address within an IP address range associated with a virtual networking infrastructure (VPC) including the gateway, to handle the routing of messages to and from the VPC. Herein, the first type of gateway may be identified differently based on its location/operability within a public cloud network, albeit the logical architecture is similar.

For example, a "spoke" gateway is a computing device (e.g., software instance) that supports routing of network traffic over an overlay network (e.g., a single cloud overlay network or multi-cloud overlay network) between components residing in different VPCs, such as an application instance requesting a cloud-based service and a VPC that maintains the cloud-based service available to multiple (two or more) tenants for example. A "transit" gateway is a gateway configured to further assist in the propagation of network traffic (e.g., one or more messages) between different VPCs such as different spoke gateways within different spoke VPCs. Alternatively, in some embodiments, the gateway may correspond to physical logic, such as a type of computing device that supports and is addressable (e.g., assigned a network address such as a private IP address).

Spoke Subnet: A "spoke subnet" is a collection of components, namely one or more spoke gateways, which are responsible for routing network traffic between components residing in different VPCs within the same or different public cloud networks, such as an application instance in a first VPC and a cloud-based service in a second VPC that may be available to multiple (two or more) tenants. Each spoke gateway includes logic accessible to a gateway data store that includes information identifying available routes for a transfer of data between resources that may reside within different subnetworks (subnets).

Transit VPC: A "transit VPC" may be generally defined as a collection of components, namely one or more transit gateways, which are responsible for assisting in the propagation of network traffic (e.g., one or more messages) between different VPCs, such as between different spoke gateways within different spoke subnets. Each transit gateway allows for the connection of multiple, geographically dispersed spoke subnets as part of a control plane and/or a data plane.

Transmission Medium: A "transmission medium" is generally defined as a physical or logical communication link (or path) between two or more components. For instance, as a physical communication path, wired and/or wireless interconnects in the form of electrical wiring, optical fiber, cable, bus trace, or a wireless channel using infrared, radio frequency (RF), may be used. As a logical communication link, AWS Direct Connect, Azure® ExpressRoute, an API or a function call may be used to communicatively couple two or more components together.

Computerized: This term and other representations generally represents that any corresponding operations are conducted by hardware in combination with software.

Create: The term "create" along with other tenses for this term generally represents generation of a component, such as a virtual private cloud network or a gateway residing within the virtual private cloud network, which may be conducted automatically through machine learning or other artificial intelligence (AI) logic or may be conducted manually based on input of data entered into a graphical user interface (GUI) by a tenant when the GUI operates as an interface for configuration of a multi-cloud overlay network.

Message: Information in a prescribed format and transmitted in accordance with a suitable delivery protocol. Hence, each message may be in the form of one or more packets (e.g., data plane packets, control plane packets, etc.), frames, or any other series of bits having the prescribed format.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Global VPC Architecture and Functionality

Figure 1A:
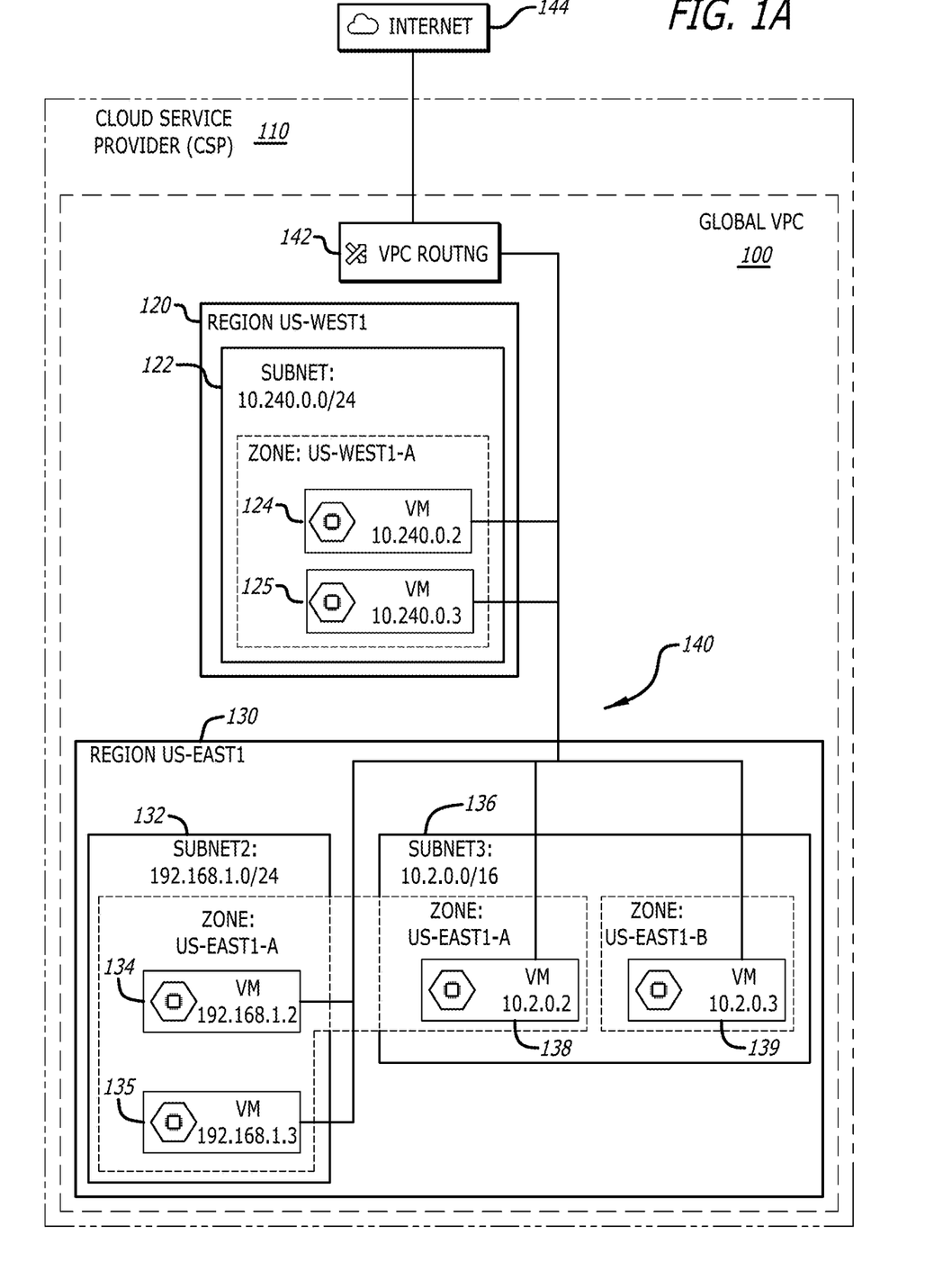
FIG. 1A is an exemplary embodiment of a global VPC provided by a cloud service provider (CSP) and supporting multiple regions.

Referring to FIG. 1A, an exemplary embodiment of a global VPC 100 provided by a cloud service provider (CSP) 110 is shown. Herein, the global VPC 100 supports multiple regions, such as a first region (US-West1) 120 and a second region (US-East1) 130. The global VPC 100 relies on a CSP network 140, namely a collection of native cloud components that support intra-VPC network traffic in lieu of an overlay network 160 as shown in FIG. 1C. Stated differently, communications between resources residing in different regions within the global VPC 100 are handled by the CSP network 140. The global VPC 100 features a VPC router 142 to extend communications from a resource over a public network 144 (e.g., Internet).

As an illustrative example, the first region 120 includes a first subnet 122 (e.g., CIDR 10.240.0.0/24), which features a pair of resources such as a first VM instance 124 (e.g., CIDR 10.240.0.2) and a second VM instance 125 (e.g., CIDR 10.240.0.3). The second region 130 includes a second subnet 132 (e.g., CIDR 192.168.1.0/24) and a third subnet 136 (e.g., CIDR 10.2.0.0/16). The second subnet 132 features a pair of resources such as a third VM instance 134 (e.g., CIDR 192.168.1.2) and a fourth VM instance 135 (e.g., CIDR 192.168.1.3). The third subnet 136 features a pair of resources such as a fifth VM instance 138 (e.g., CIDR 10.2.0.2) and a sixth VM instance 139 (e.g., CIDR 10.2.0.3).

Figure 1B:
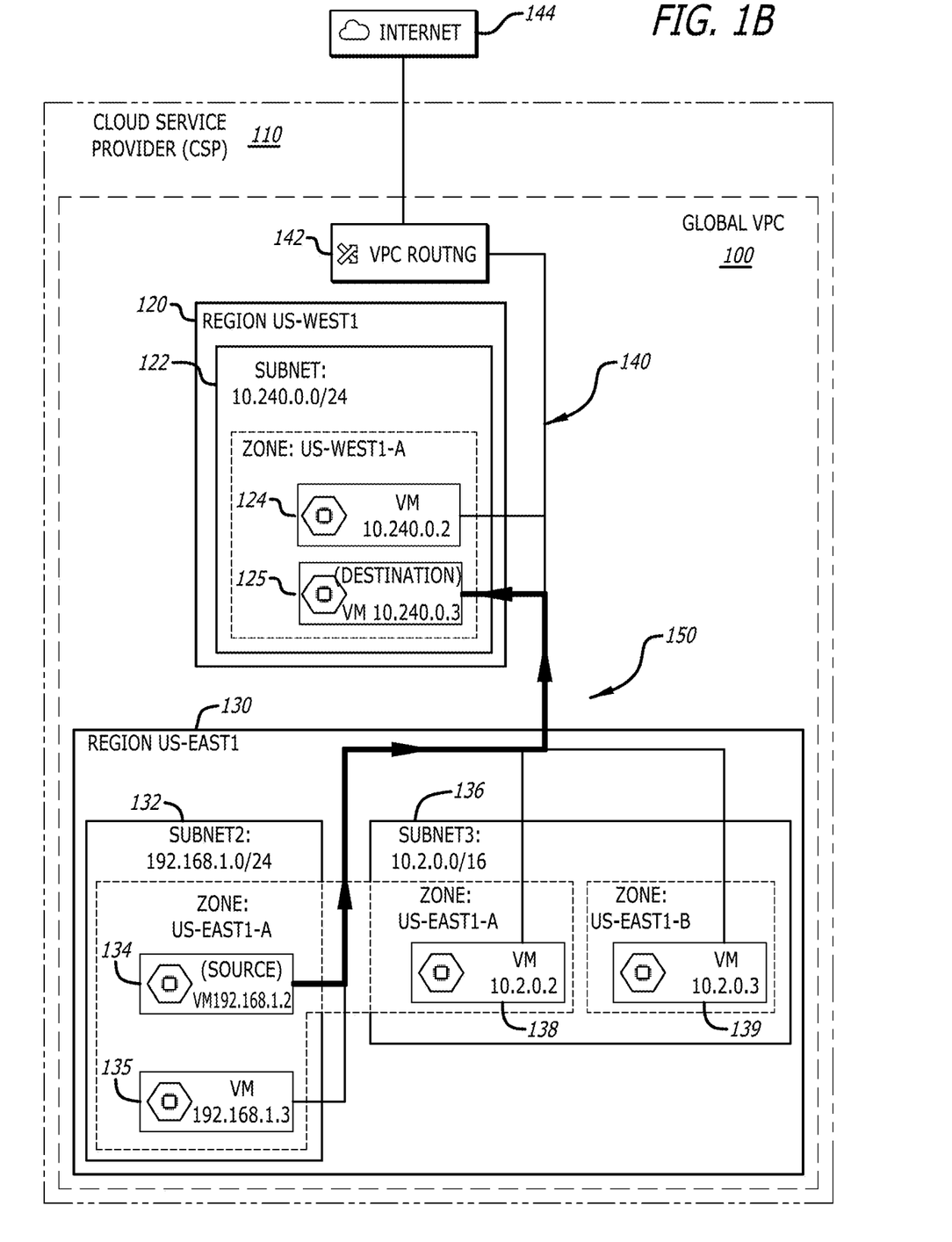
FIG. 1B is an exemplary embodiment of the global VPC of FIG. 1A with the native CSP constructs supporting intra-VPC, inter-region network traffic.
Figure 1C:
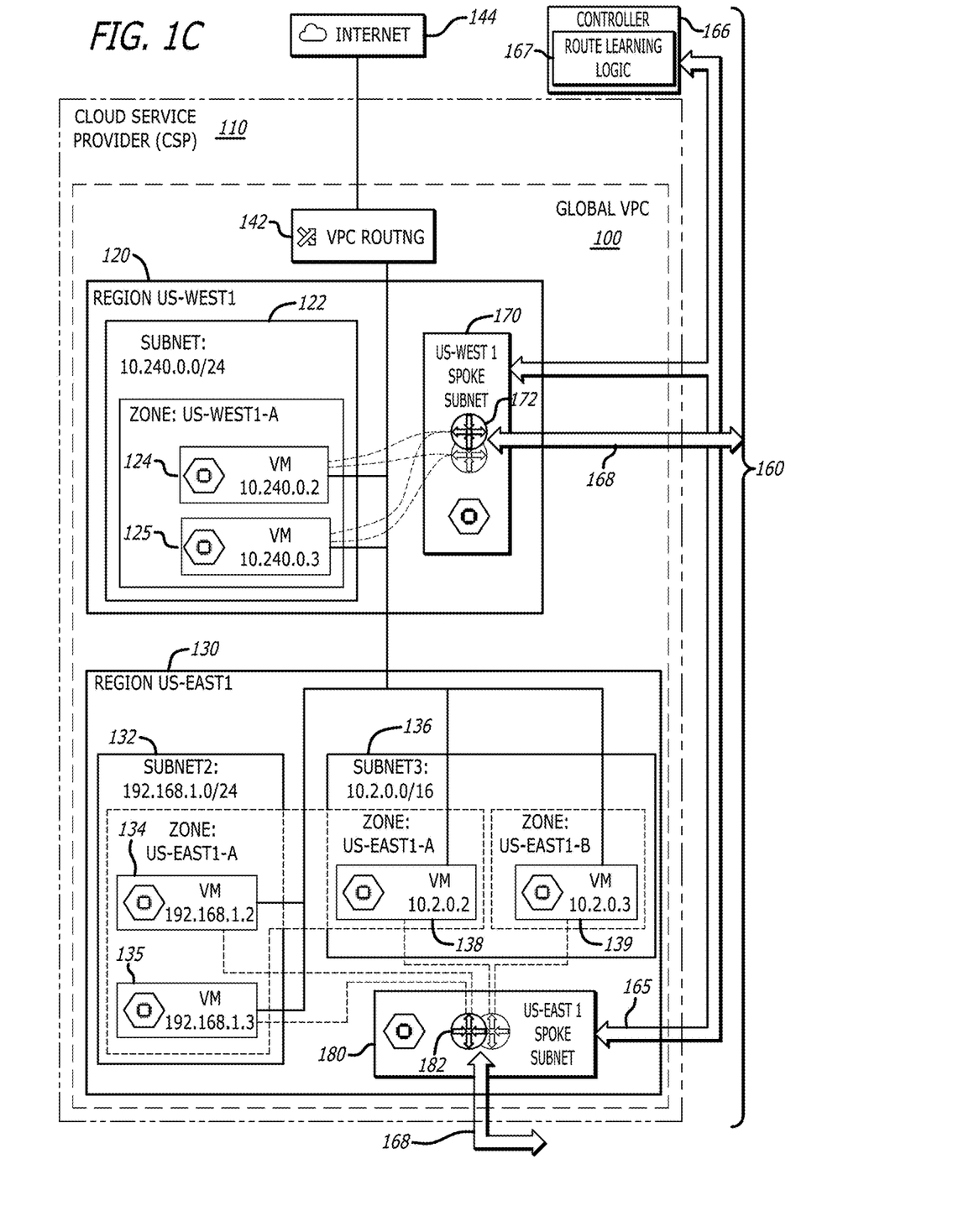
FIG. 1C is an exemplary embodiment of the global VPC of FIG. 1A with an overlay network supporting inter-VPC network traffic.

Herein, as shown in FIG. 1B, the third VM instance 134 of the global VPC 100 is configured to communicate with the second VM instance 125 via the CSP network 140. As shown, the native cloud components forming the CSP network 140 support intra-VPC, inter-region network traffic, such as network traffic 150 between the third VM instance 134 associated with the second region 130 and the second VM instance 125 associated with the first region 120 of the global VPC 100.

Referring now to FIG. 1C, an exemplary embodiment of the global VPC 100 of FIGS. 1A-1B with an overlay network 160 supporting inter-VPC network traffic is shown. Herein, the overlay network 160 corresponds to a software-defined overlay network, which may operate in accordance a private network addressing scheme (e.g., Internet Protocol "IP" addresses). Herein, a control plane 165 of the multi-cloud overlay network 160 features a controller 166, a first spoke subnet 170 associated with the first region 120 of the global VPC 100 and a second spoke subnet 180 associate with the second region 130 of the global VPC 100.

The first spoke subnet 170 includes a first plurality of spoke gateways 172 operating as ingress (input) and/or egress (output) points for network traffic that is sourced by (or destined to) a resource of a first set of resources (e.g., VM instances 124-125) within the first subnet 122 and directed to (or received by) another VPC via the overlay network 160. The overlay network 160 may be configured as a single-cloud overlay network or a multi-cloud overlay network. Similarly, the second spoke subnet 180 includes a second plurality of spoke gateways 182 operating as ingress (input) and/or egress (output) points for network traffic sourced by (or destined to) either (i) a resource of a second set of resources (e.g., VM instances 134-135) within the second subnet 132 or (ii) a resource of a third set of resources (e.g., VM instances 138-139) within the third subnet 136.

The controller 166 includes route learning logic 167, which is configured to retrieve addressing information associated with subnets within different regions of the global VPC 100. According to one embodiment of the disclosure, the addressing information may include the VPC subnet address (e.g., CIDR 10.240.0.0/24) within the first region 120 associated with the first plurality of spoke gateways 172 and VPC subnet addresses (e.g., CIDR 192.168.1.0/24 and CIDR 10.2.0.0/16) within the second region 130 associated with the second plurality of spoke gateways 182. Thereafter, the controller 166 programs components associated with the control plane 165 and its data plane 168 forming a portion of the overlay network 160 to instruct these components to direct messages targeting specific region subnets 122 or 132/136 to go to their corresponding regional spoke gateways 172 and 182, respectively.

Figure 2:
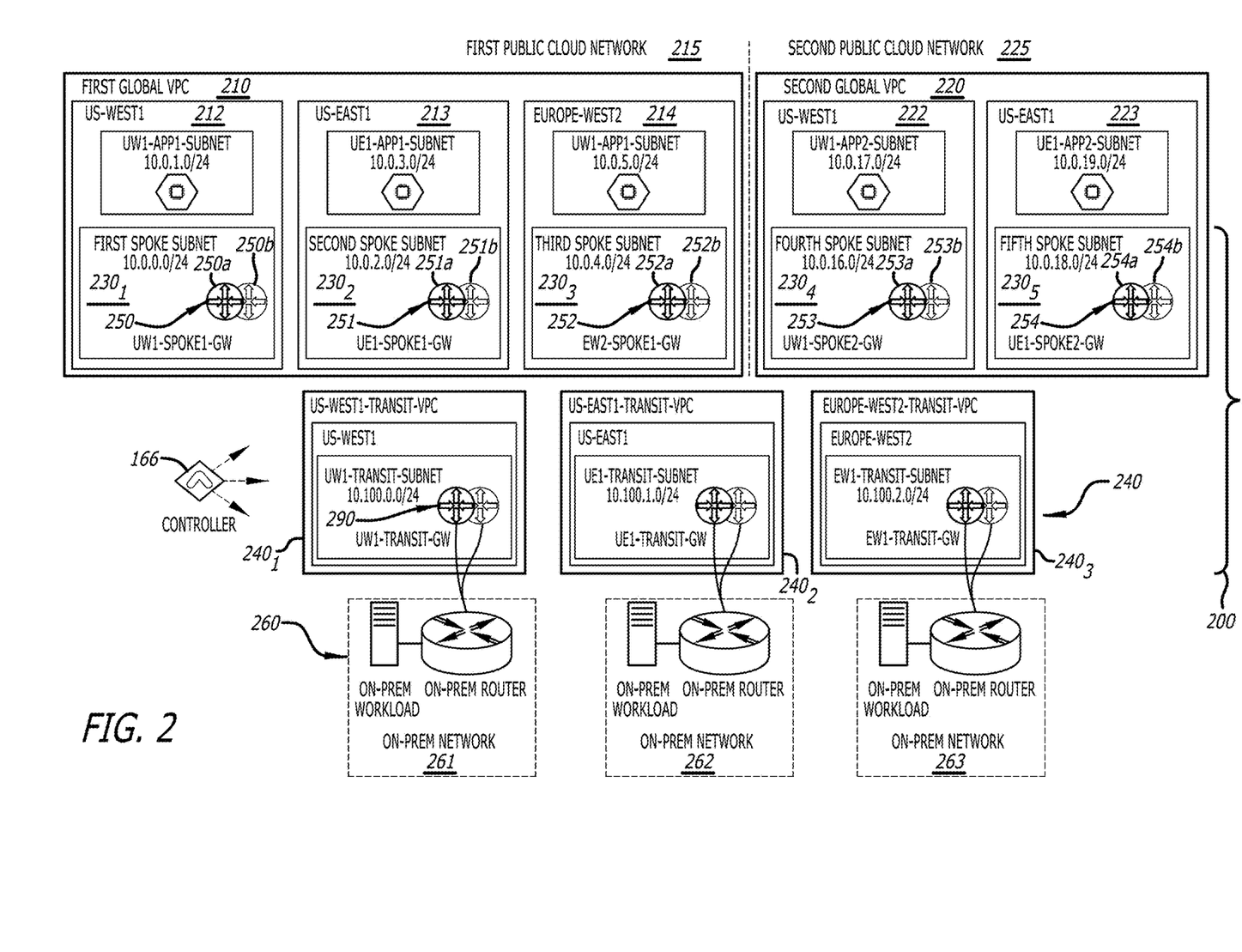
FIG. 2 is an exemplary embodiment of a multi-cloud overlay network supporting inter-VPC communications with regional spoke gateways and controller-based route learning and propagation with region awareness.

Referring to FIG. 2, an exemplary embodiment of the overlay network 160 of FIG. 1C, operating as a multi-cloud overlay network 200 supporting inter-VPC communications with regional spoke gateways and controller-based route learning and propagation with region awareness, is shown. Herein, a first global VPC 210 and a second global VPC 220 are in communication over the multi-cloud overlay network 200. The multi-cloud overlay network 200 includes (i) the controller 166, (ii) spoke subnets $230_1$-$230_N$ (N≥1, N=5) each deployed in a different region of the first global VPC 210 or the second global VPC 220, and (iii) one or more transit VPCs $240_1$-$240_M$ (M≥1, M=3). As shown, the multi-cloud overlay network 200 supports inter-VPC communications between components residing in the first global VPC 210 residing within a first public cloud network 215 and the second global VPC 220 residing within a second public cloud network 225 that is different from the first public cloud network 215.

More specifically, according to one illustrative embodiment of the multi-cloud overlay network 200, a first spoke subnet $230_1$ is deployed to communicate with components residing within a first region 212 of the first global VPC 210. Similarly, second and third spoke subnets $230_2$-$230_3$ are deployed to communicate with components residing within second and third regions 213-214 of the first global VPC 210. A fourth spoke subnet $230_4$ is deployed to communicate with components residing within a first region 222 of the second global VPC 220 while a fifth spoke subnet $230_5$ is deployed to communicate with components residing within a second region 223 of the second global VPC 220. Herein, a plurality of spoke gateways 250-254 are each deployed within a corresponding spoke subnet $230_1$-$230_5$, respectively. The controller 166 is configured to provide and exchange control messages with each gateway of the plurality of gateways 250-254.

As further shown, the transit VPCs 240 support inter-VPC communications between components residing in the first global VPC 210 and the second global VPC 220 as well as a tenant's on-premises (on-prem) networks 260. As the first and second regions 212-213 of the first global VPC 210 may correspond to the same geographically regions as the first and second regions 222-223 of the second global VPC 220, a first transit VPC $240_1$ supports communications with gateways 250 associated with the first spoke subnet $230_1$, gateways 253 associated with the fourth spoke subnet $230_4$ as well as communications with neighboring transit VPC $240_2$ and on-prem network 261. The first transit VPC $240_1$ is not connected to those spoke subnets outside of the first region 212/222.

Similarly, a second transit VPC $240_2$ supports communications with gateways 251 associated with the second spoke subnet $230_2$, gateways 254 associated with the fifth spoke subnet $230_5$, neighboring transit VPCs $240_1$ and $240_3$ and on-prem network 262. The second transit VPC $240_2$ is not connected to those spoke subnets outside of the first region 213/223. As the third region 214 of the first global VPC 210 is a geographically region different from the others, a third transit VPC $240_3$ is deployed to support the third second region 214 of the first global VPC 210 as well as communications with neighboring transit VPCs $240_2$ and on-prem network 263. The third transit VPC $240_3$ is not connected to those spoke subnets outside of the first and second regions 212/222 and 213/223, respectively.

Herein, the controller 166 is configured to retrieve addressing information associated with subnets within different regions of each global VPC 210 and 220, which may reside within the same or within different public cloud networks as shown. According to this embodiment of the disclosure, as the creation of the plurality of the gateways 250 and 251, the controller 166 is aware of the presence of a first plurality of spoke gateways 250a-250b (uw1-spoke1-gw) associated with the first region 212 (US-West1) and a second plurality of gateways 251a-251b (ue1-spoke1-gw) associated with the second region 213 (US-East1) of the first VPC 210. The controller 166 further aware of the presence of a third plurality of spoke gateways 252a-252b (ew2-spoke1-gw) associated with the third region 214 (Europe-West2) of the first global VPC 210, a fourth plurality of spoke gateways 253a-253b (uw1-spoke2-gw) associated with the first region 222 (US-West1) of the second VPC 220 and a fifth plurality of gateways 254a-254b (ue1-spoke2-gw) associated with the second region 223 (US-East1) of the second VPC 220. As a result, spoke gateway data stores relied upon by the spoke gateways solely include routing information associated with gateways (e.g., transit gateway (s)) in the same region to avoid cross-region communications that are more costly and subject to reduced signal quality.

III. Control Plane Learning

Figure 3:
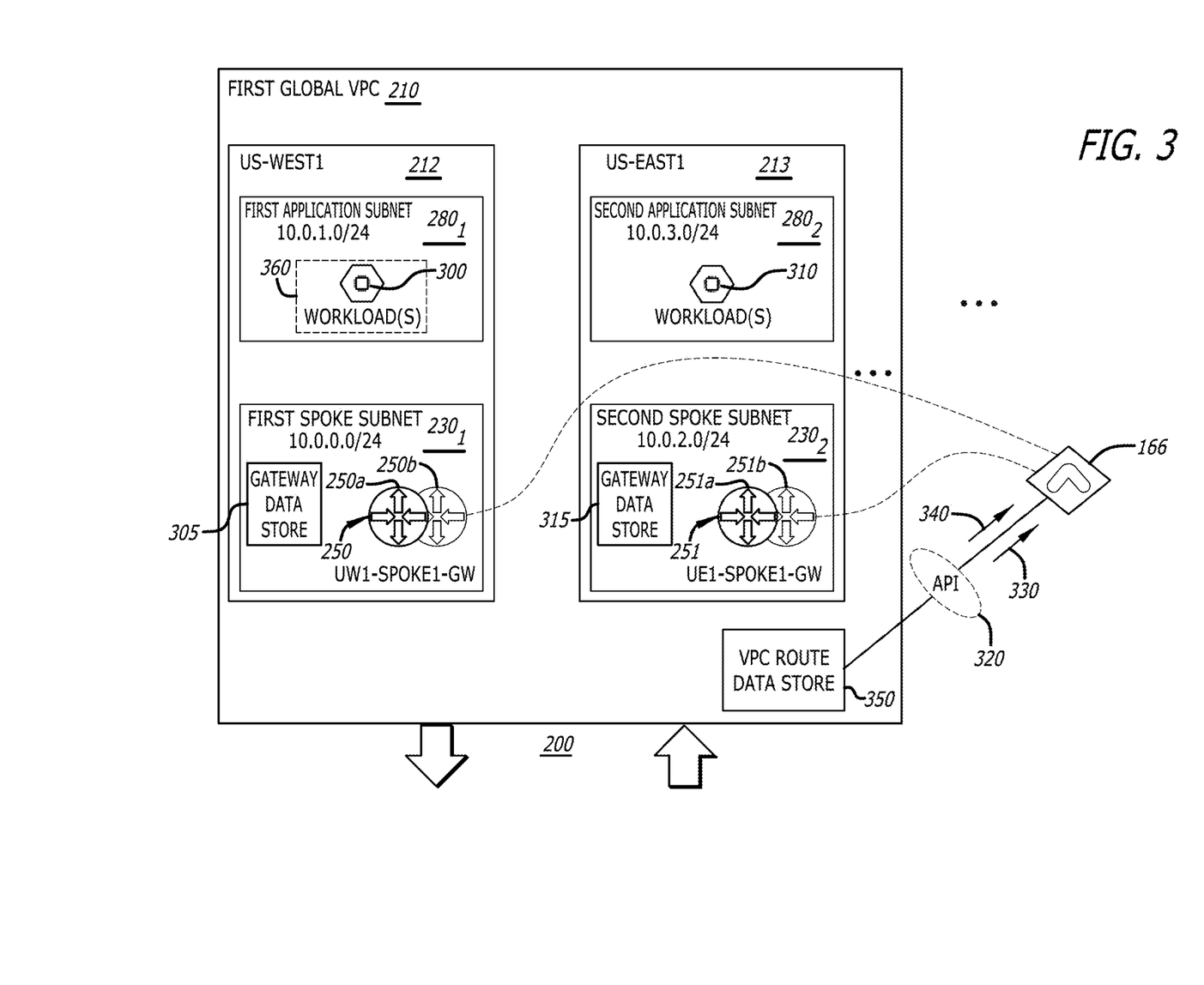
FIG. 3 is an exemplary embodiment of a region-based spoke subnet including spoke gateways supporting communications over the multi-cloud overlay network with one or more workloads within that region.

Referring now to FIG. 3, an exemplary embodiment of region-based spoke subnets $230_1$ and $230_2$ deployed within the first and second regions 212-213 of the first global VPC 210 of FIG. 2 is shown. The first region-based spoke subnet $230_1$ includes the plurality of spoke gateways 250 (e.g., spoke gateways 250a-250b), which support communications over the multi-cloud overlay network 200 involving one or more workloads (hereinafter, "workload(s)") 300 within the first region 212 as a source or destination for such communications. Similarly, the second region-based spoke subnet $230_2$ includes a plurality of spoke gateways 251a-251b, which support communications over the multi-cloud overlay network 200 involving workload(s) 310 within the second region 213 as a source or destination for such communications.

Herein, the controller 166 may be configured to invoke CSP APIs to learn about workload(s) within different regions of VPCs to which the multi-cloud overlay network 200 is coupled. For instance, controller 166 may be configured to invoke the CSP APIs 320 to retrieve VPC routes 330 for the first/second region 212/213 where the spoke gateways 250/251 are deployed, but not the entire VPC. As an illustrative example, as shown in FIG. 3, the controller 166 would invoke the CSP APIs 320 to receive the VPC routes 330 associated the first region 212 of the first global VPC 210 from a VPC route data store 350. The VPC route data store 350 includes information that would identify the first spoke gateway subnet $230_1$ (e.g., CIDR 10.0.0.0/24) and an application subnet $280_1$ (e.g., CIDR 10.0.1.0/24), including workload(s) 300. Also, the controller 166 may be configured to invoke the CSP APIs 320 to receive VPC routes 340 associated with the second region 213 of the first global VPC 210. Herein, the VPC routes 340 would identify the second spoke gateway subnet $230_2$ (e.g., CIDR 10.0.2.0/24) and an application subnet address $280_2$ (e.g., CIDR 10.0.3.0/24), namely workload(s) 310 within the second region 213 of the first global VPC 210 communicatively coupled to the second spoke gateways 251.

Thereafter, the controller 166 may be configured to program data stores relied upon by the control plane and data plane in the multi-cloud overlay network 200 (e.g., gateway data stores, etc.) to force spoke gateways within other different regions of VPC accessible to the multi-cloud overlay network 200 to direct data messages based on regional preference. For example, the controller 166 may be configured to program one or more gateway data stores 305 accessed by the first plurality of spoke gateways 250 so that communications directed to/from workload(s) 300 within the first application subnet (CIDR 10.0.1.0/24) are handled by the first plurality of spoke gateways 250. Additionally, the controller 166 may be configured to program one or more gateway data stores 315 accessed by the second plurality of spoke gateways 251 so that communications directed to/from workload(s) 310 within the second application subnet (CIDR 10.0.3.0/24) are handled by the second plurality of spoke gateways 251.

Referring to both FIGS. 2-3, when a spoke gateway is communicatively coupled to a transit gateway, the region of the global VPC where the spoke gateway resides becomes part of the multi-cloud overlay network 200. As an illustrative example, in response to the spoke gateway 250a being communicatively coupled to one or more transit gateways 290 of the first transit VPC $240_1$, the controller 166 of the control plane collects networking routes associated with workload(s) residing in the first region 212, namely networking routes associated with the first application subnet $280_1$ and the first spoke subnet $230_1$. The controller 166 of the control plane is further configured to learn that the spoke gateway (e.g., spoke gateway 250a) should be selected as the spoke gateway for network traffic destined for a workload within the first region 212 of the first global VPC 210.

Additionally, workload(s) (e.g., workload 360) could be added or removed by the tenant (user) after attachment of a spoke gateway (e.g., spoke gateway, and hence, subnet routes may be added or removed after attachment of the spoke gateway. Herein, the controller 166 may be configured to dynamically discover new network routes (and new workload(s)) by conducting a discovery process that features a collection of sub-processes. For example, the sub-processes may include a first sub-process that involves the controller 166 (i) polling the CSP API 320 or (ii) subscribing to a CSP notification service (not shown) to receive a current discovery list of networking routes (e.g., subnet routes). Thereafter, in accordance with a second sub-process, the controller 166 compares the contents of the current discovery list to contents of a prior discovery list to determine whether any new networking routes (or workload(s)) have been added or removed. During the second sub-process, the newly added workload 360 would be detected, and if workload(s) 300 was removed, the removal of the workload would be detected as well. Thereafter, the current discovery list is stored in a data store accessible by the controller 166.

Alternatively, where workloads are tagged to denote their region of operation, in lieu of the first and second sub-processes described above, the discovery process may involve a determination as to which workload(s) are untagged (i.e., no tag assigned to them). Upon identify a workload that needs a tag (e.g., new workload 360), the controller 166 applies the relevant route tag to the workload 360 based on its region and subnet (or VPC) such as "UW1a-SPOKE1-TAG" representing a tag associated with resources within the first region 212.

As yet another alternative embodiment, the learning of the creation of networking routes after attachment of the spoke gateway, may be performed manually. In this case, the user manually adds or remove subnet routes on the controller 166, and the routes may be configured to specify the region and VPC. This can be preferable for users, who want more control of the multi-cloud overlay network 200, at the expense of reactivity. However, this procedure is not automated as the discovery processes described above.

IV. Control Plane Propagation

Figure 4A:
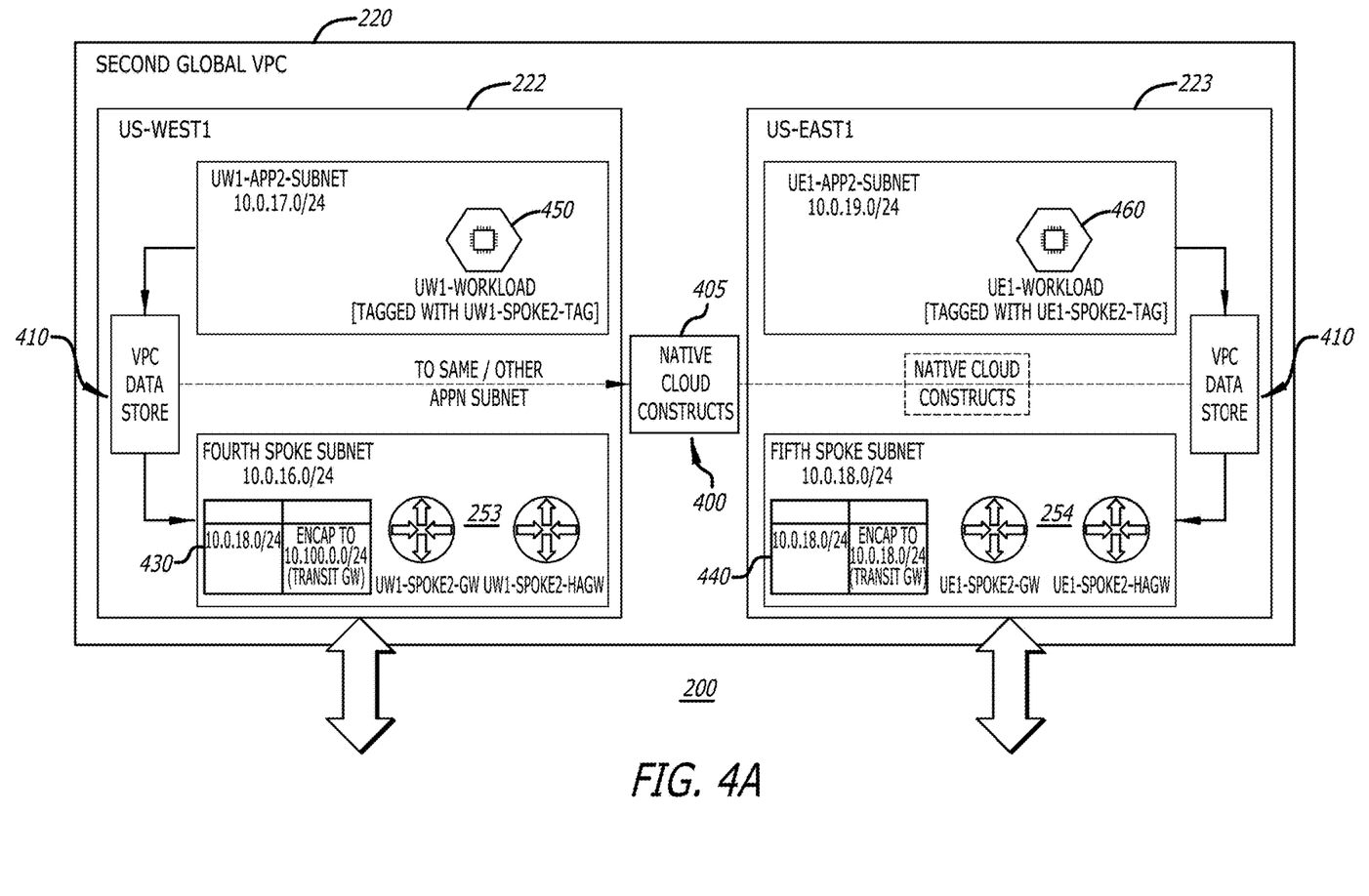
FIG. 4A is an exemplary embodiment of route propagation into the multi-cloud overlay network through route tagging.

Referring now to FIG. 4A, an exemplary embodiment of route propagation within the multi-cloud network, including the multi-cloud overlay network 200 and an underlay control network 400, is shown. As described above, the subnet routes associated with the global VPCs, such as the second global VPC 220 as shown, are learned by the controller 166. Thereafter, these subnet routes are propagated by the control plane into data stores utilized by the multi-cloud network, including VPC route data store 410 and/or gateway route data stores (overlay) 430 and 440.

Herein, in accordance with a region awareness, underlay route propagation associated with the second global VPC 220 of FIG. 2 may be achieved by at least directing network traffic originating from workload(s) 450 and 460 (e.g., applications, VM instances, etc.) into corresponding spoke gateways 253 and 254, respectively. More specifically, by restricting routing propagation from the first workload 450, residing within a specific region (e.g., first region 222) to one or more gateways 253 associated with that region 222, the network traffic may be appropriately directed to enter the multi-cloud overlay network 200 without cross-region communications.

Within the underlay network 400, routing propagation is conducted in accordance with the VPC route data store 410 programmed and maintained by the control plane. Where the destination constitutes an intra-VPC communication, the VPC route data store 410 does not identify the regional spoke gateway, but instead, identifies a targeted destination within the second global VPC 220 in which native cloud (routing) constructs 405 forming a portion of the underlay network 400 handle the intra-VPC communications.

To achieve region awareness, various methods can be used depending on the CSP such as route tagging. In route tagging, routes are created by the controller (not shown, see controller 166 of FIG. 2) for each pair of spoke gateways 253 and 254, where route tags 470 are unique to identify a region in which the spoke gateways reside. Thereafter, the controller assigns one of these route tags to each workload (e.g., workloads 450 and 460), where workload(s) 450/460 within each region of the second global VPC 220 is assigned route tags 480 associated with that region so that network traffic originating from these workload(s) are routed to their regional spoke gateway(s). As a result, the tagging sequence includes (1) attaching each spoke gateway to each corresponding transit gateway; (2) creating VPC routes with route tags for all routes known by the controller; and (3) tagging the workload(s) with the route tags in accordance with the region in which the workload is operating.

Figure 4B:
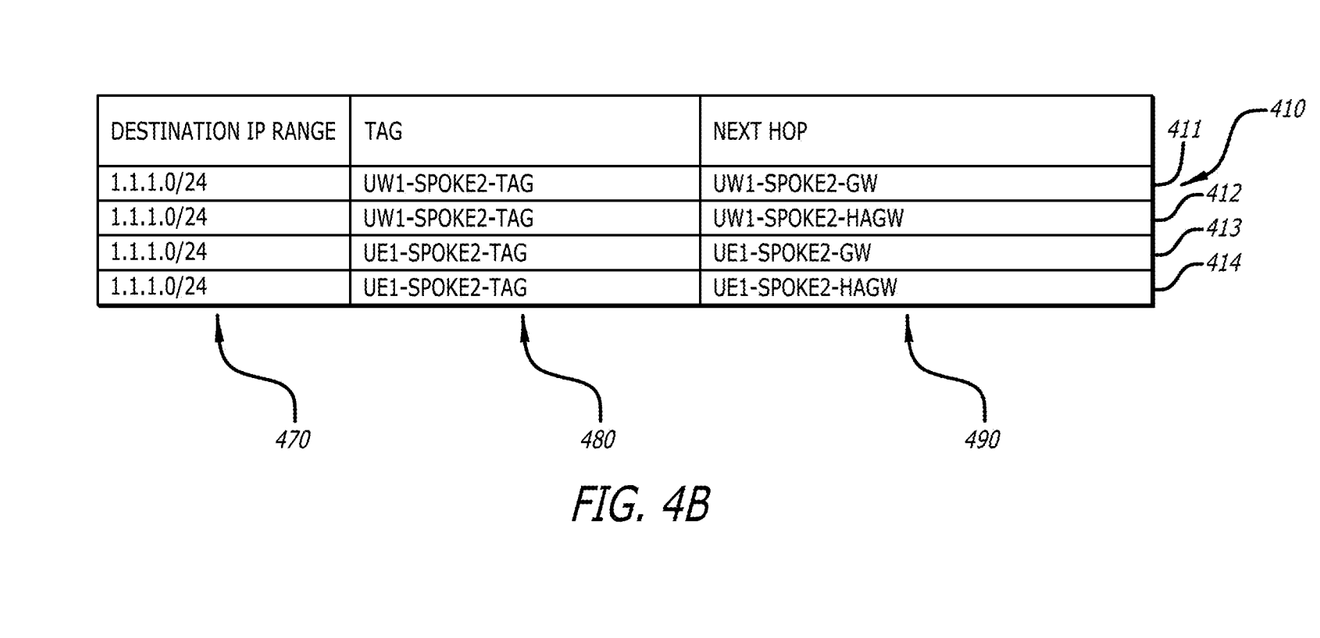
FIG. 4B is an exemplary embodiment of a VPC route data store to control route propagation through route tagging as illustrated in FIG. 4A.

As an illustrative example, as shown in FIG. 4B, the controller is configured to learn of a VPC (or on-prem network) when it advertises its network address (e.g., CIDR 1.1.1.0/24). Upon learning of the VPC (or on-prem network), a route is programmed in the VPC data store 410 associated with the global VPC 220. According to one embodiment of the disclosure, the VPC data store 410 may be configured with a destination IP range (destination subnet) 470, route tags 480 and next hop identifiers 490. The destination IP range 470 identifies the advertised network address. The route tags 480 identify tag values associated with the workloads, such as a first entry pair 411/412 identifies tag values associated with communications sourced by the workload 450 while a second entry pair 413/414 identifies tag values associated with communications sourced by the workload 460. The next hop identifiers 490 identifies the spoke gateway and/or redundant spoke gateway as to intermediate destination (next hop) for communications directed to the advertised resource (e.g., CIDR 1.1.1.0/24).

Thereafter, after the VPC route data store 410 has been programmed by the controller, each workload (e.g., workload(s) 450/460) identified in the gateway (route) data store 430/440 is tagged with a tag value 480 corresponding to its region.

It is contemplated that workload(s) 450/460 can be added by the user after tagging of the spoke gateways 253/254. Therefore, if tagging is the mechanism supported by the CSP to influence the VPC routing, then the workload(s) 450/460 have to be tagged for traffic to reach their regional spoke gateway 253/254, respectively. So, the controller is able to dynamically discover new workload(s) by either polling the CSP API 320 (see FIG. 3) or by subscribing to a CSP notification service to formulate a new list of workload(s) associated with each region. Thereafter, the current list of workload(s) is compared with the existing list of workload(s) to determine which any workload(s) are new and identify these workload(s). The list is stored on the controller. However, where tagging is utilized, the discovery process may involve a determination whether a discovered workload has an assigned tag. Upon identify a workload that needs a tag, the controller applies the relevant route tag to the workload based on its region and VPC, as shown in FIGS. 4A-4B.

Figure 5:
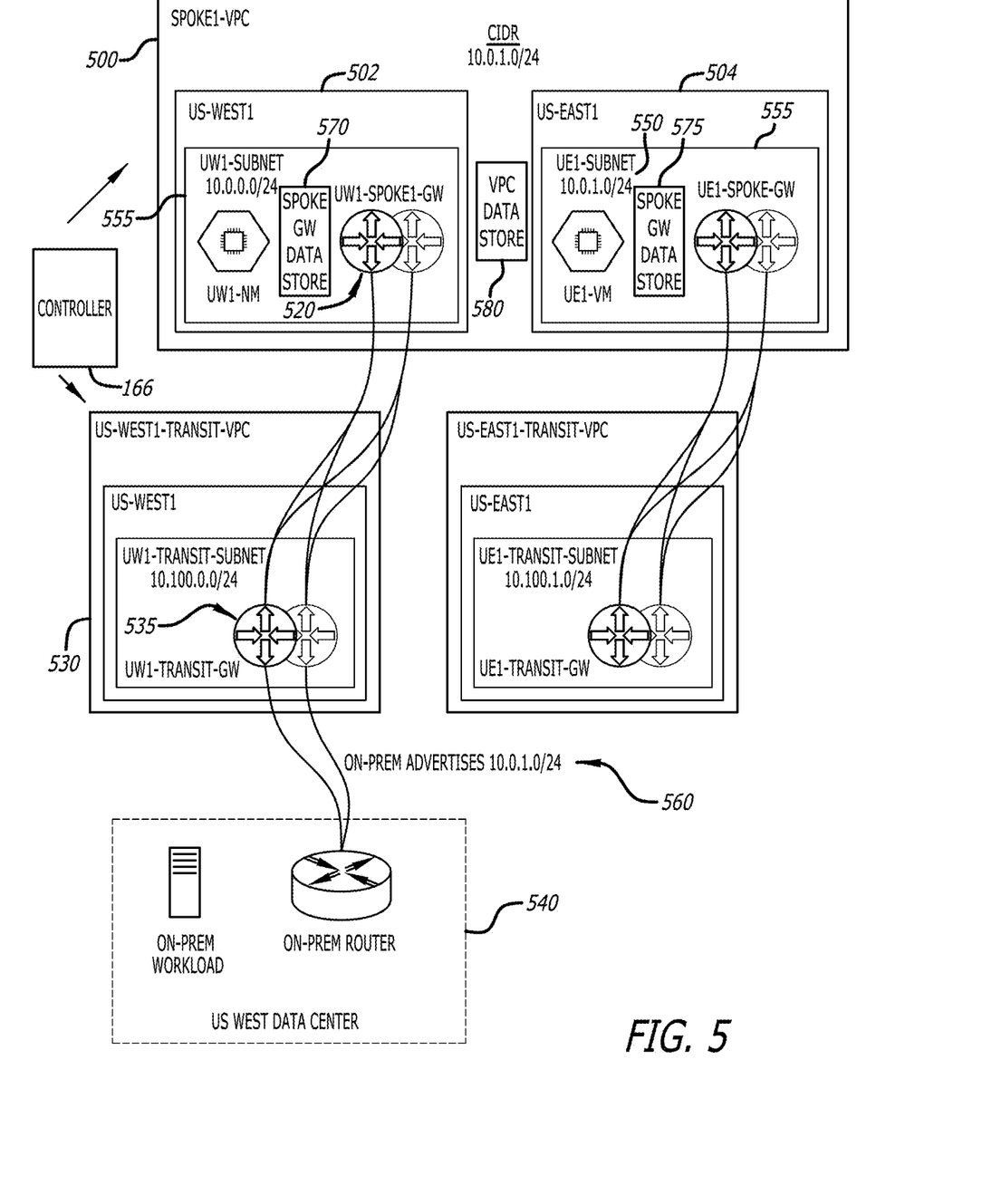
FIG. 5 is an exemplary embodiment of control plane operations of the multi-cloud overlay network in handling conflicting data message propagation routes.

Referring to FIG. 5, an exemplary embodiment of control plane operations of the multi-cloud overlay network 200 in handling conflicting data message propagation routes is shown. Before propagating a route to a VPC (e.g., Spoke1-VPC) 500, the controller 166 of the control plane 165 checks for a conflict against the subnet routes in all regions (e.g., regions 502, 504) of the VPC 500—not only the region (e.g., region 502) where spoke gateways 520 exist or are attached to the transit VPC 530. If there is a conflict, then the controller 166 raises an alert and rejects the propagation entirely to the VPC 500 because, from the perspective of that VPC 500, a conflicting default VPC subnet route exists. For most public cloud networks, default VPC subnet routes are specific routes and unlikely to program the VPC route data store with a more specific route to avoid the conflict.

As an illustrative example, as shown in FIG. 5, CIDR 10.0.1.0/24 550 is a subnet address associated with a spoke subnet 555 in the region 504 (us-east1 region). In the event that an on-prem network 540 advertises a network address 560 (e.g., CIDR 10.0.1.0/24) to the transit VPC 530, in particular transit gateways 535 (uw1-transit-gw), the controller 166 conducts analytics on contents within the gateway route data stores 570/575. However, in any region of the VPC 500 (including us-west1), the controller 166 determines whether an advertised network address points to an existing component with a VPC. As an illustrative example, the controller 166 determines whether the advertised network address 560 (CIDR 10.0.1.0/24) points to any spoke subnet (e.g., spoke subnet 555 operating in the second region 504 different than region 502). Therefore, the controller 166 issues an alert to warn the user about the conflict, and CIDR 10.0.1.0/24 is not propagated to a VPC data store 580 of the spoke VPC 500 that controls message routing between resources and the underlay and overlay network components.

Figure 6:
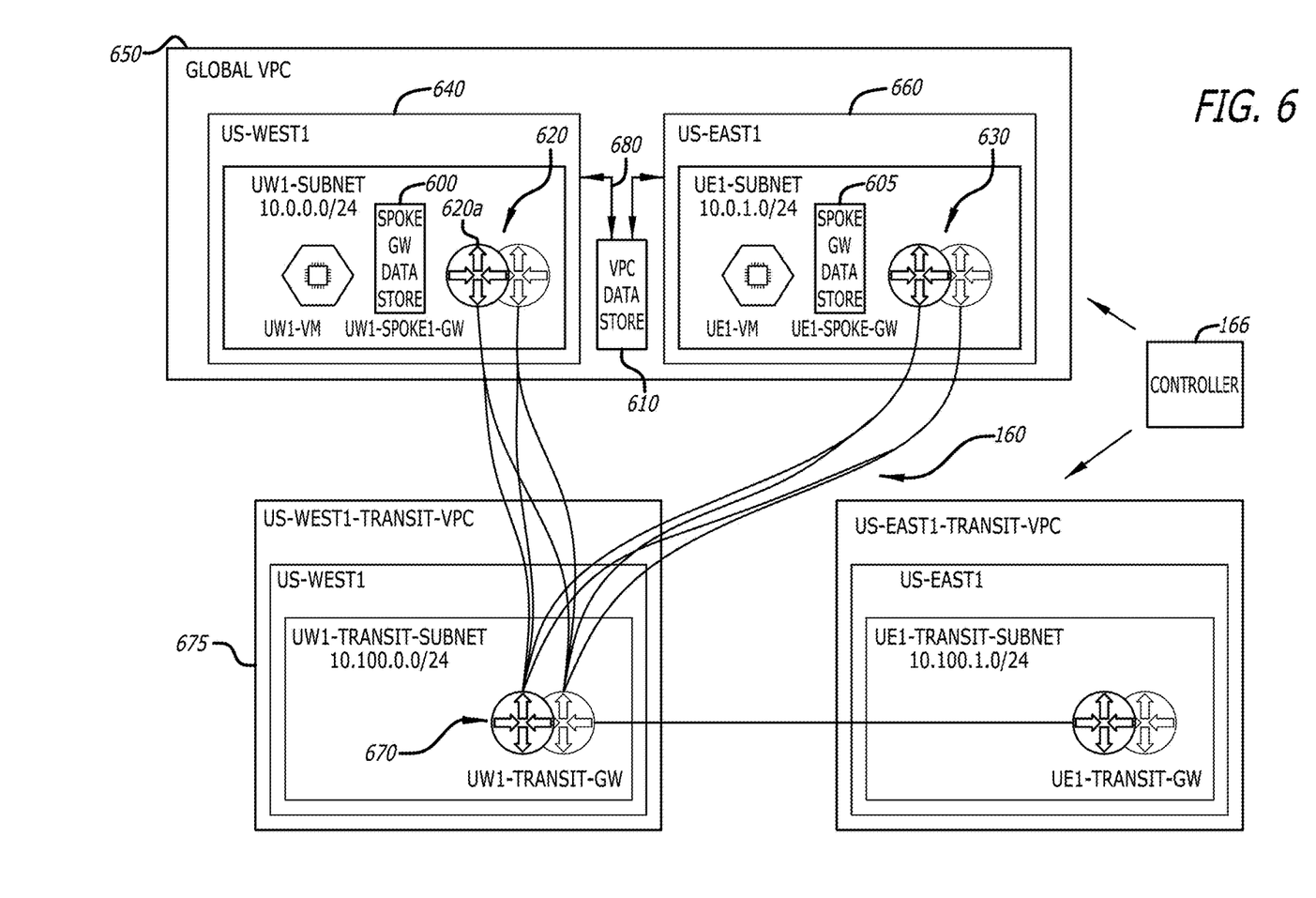
FIG. 6 is an exemplary embodiment of an overlay network to support intra-VPC communications.

Referring now to FIG. 6, an exemplary embodiment of the overlay network 160 to support intra-VPC communications is shown. The subnet routes are propagated by the control plane into data stores 600, 605 and 610 accessible by the gateways 620 and 630 as well as to within an on-premises network (not shown). However, what is specific about the regional preference is that the control plane is not propagating the subnet routes of a given VPC region (e.g., region "US-West1" 640) into the gateway data store 600 accessible by a first spoke gateway 620a, which is in the same VPC 650 but in a different region 660 even where the spoke gateways are connected to the same transit gateway 670. Intra-VPC traffic is routed through the VPC underlay 680, even if the network traffic is inter-region. The network traffic does not enter the overlay network 160. This behavior compared to sending packets to the transit VPC 675 has the advantage of a lower latency where the transit gateway 670 is available for inter-VPC traffic.

The subnet route orientation is achieved by the controller 166 having the understanding of both the VPC and the region for all learned subnets. When deciding programming of a subnet in a spoke gateway data store (e.g., spoke GW data store 600 and/or 610), the controller 166 considers both the VPC 650 and the region 640 or 660 of that subnet. Stated differently, spoke gateway data stores 600/610 maintain routes belonging to a region in which the spoke gateway 620/630 accessing the spoke gateway data store 600/610 resides.

As an illustrative example, presuming that CIDR 1.1.1.0/24 is a subnet advertised by another VPC. The control plane 166 does not propagate the CIDR of the second spoke gateway subnet (CIDR 10.0.1.0/24) into the first spoke gateway data store 600. Even though a route belongs to another region (us-east1), it is in the same VPC as the first spoke gateways (uw1-spoke1-gw) 620. In contrast, CIDR 1.1.1.0/24 belongs to another VPC. It is programmed in the first spoke gateway data store 600, with next hop being the transit gateways.

So, the gateway data store of uw1-spoke1-gw is programmed by the controller 166 as such:

| Destination IP range | Next hop |
|---|---|
| 1.1.1.0/24 | uw1-transit-gw |
| 1.1.1.0/24 | uw1-transit-hagw |

Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A computerized method, comprising:
    deploying one or more spoke gateways within at least a first region and a second region of a first virtual private cloud network;
    determining a region and a virtual private cloud network associated with a source and a destination of a communication;
    determining whether the destination of the communication resides within a second virtual private cloud network different than the first virtual private cloud network; and
    responsive to the destination residing within the second virtual private cloud network, controlling routing of the communication between the source and the destination by one or more spoke gateways solely residing within the region in which the source,
    wherein the one or more spoke gateways is deployed as part of a cloud overlay network further including at least a transit gateway and a second spoke gateway deployed within the second region of the first virtual private cloud network.

2. The computerized method of claim 1 further comprising:
    responsive to both the source and destination residing within the first virtual private cloud network, controlling routing of the communication between the destination and the source by native cloud constructs associated with a cloud service provider (CSP) underlay network for a first public cloud network.

3. The computerized method of claim 2, wherein the second virtual private cloud network is deployed within the first public cloud network.

4. The computerized method of claim 1, wherein the source is a first application instance residing in the first region and communicatively coupled to a first spoke gateway of the one or more spoke gateways and is prevented from being connected to the second spoke gateway residing in the second region of the first virtual private cloud network different than the first region.

5. The computerized method of claim 1, wherein the overlay network is created and maintained based on a control plane learning scheme and a control plane propagation scheme.

6. The computerized method of claim 5, further comprising acquiring location information associated with the one or more spoke gateways when the one or more spoke gateways are created.

7. The computerized method of claim 1, wherein the overlay network is configured as a single-cloud overlay network.

8. The computerized method of claim 1, wherein the overlay network is configured as a multi-cloud overlay network.

9. The computerized method of claim 1, wherein the second virtual private cloud network is deployed within a second public cloud network different than a first public cloud network.

10. The computerized method of claim 9, wherein the source is a first application instance communicatively coupled to a first spoke gateway of the one or more gateways and the destination is a second application instance operating within the second public cloud network and communicatively coupled to a second spoke gateway.

11. The computerized method of claim 1, wherein the one or more spoke gateways within the first region comprise at least one spoke gateway configured as an egress point for network traffic to be propagated through an overlay network from a workload deployed within the first region.

12. The computerized method of claim 1, wherein the one or more spoke gateways within the first region comprise at least one spoke gateway configured as an ingress point for network traffic through an overlay network directed to a workload deployed within the first region.

13. The computerized method of claim 1, wherein, responsive to a spoke gateway of the one or more spoke gateways is deployed within the first region, programming a data store accessible to the spoke gateway that restricts access to application subnets only operating in the first region.

14. A computerized method, comprising:
   deploying one or more spoke gateways within at least a first region and a second region of a first virtual private cloud network;
   determining a region and a virtual private cloud network associated with a source and a destination of a communication;
   determining whether the destination of the communication resides within a second virtual private cloud network different than the first virtual private cloud network; and
   responsive to the destination residing within the second virtual private cloud network, controlling routing of the communication between the source and the destination by one or more spoke gateways solely residing within the region in which the source,
   wherein the second virtual private cloud network is deployed within a second public cloud network different than a first public cloud network, wherein the source is a first application instance communicatively coupled to a first spoke gateway of the one or more gateways and the destination is a second application instance operating within the second public cloud network and communicatively coupled to a second spoke gateway.

15. A computerized method, comprising:
   deploying one or more spoke gateways within at least a first region and a second region of a first virtual private cloud network;
   determining a region and a virtual private cloud network associated with a source and a destination of a communication;
   determining whether the destination of the communication resides within a second virtual private cloud network different than the first virtual private cloud network; and
   responsive to the destination residing within the second virtual private cloud network, controlling routing of the communication between the source and the destination by one or more spoke gateways solely residing within the region in which the source,
   wherein, responsive to a spoke gateway of the one or more spoke gateways is deployed within the first region, programming a data store accessible to the spoke gateway that restricts access to application subnets only operating in the first region.

* * * * *